United States Patent [19]

Nowack et al.

[11] Patent Number: 5,655,791
[45] Date of Patent: Aug. 12, 1997

[54] ROLL BAR EQUIPMENT WITH INNER GUIDE AND OUTER GUIDE

[75] Inventors: Reinhard Nowack, Drolshagen; Jakob Lowen, Bergneustadt, both of Germany

[73] Assignee: ITT Automotive Europe GmbH, Frankfurt, Germany

[21] Appl. No.: 596,087

[22] PCT Filed: Jul. 22, 1994

[86] PCT No.: PCT/EP94/02417

§ 371 Date: May 15, 1996

§ 102(e) Date: May 15, 1996

[87] PCT Pub. No.: WO95/03952

PCT Pub. Date: Feb. 9, 1995

[30] Foreign Application Priority Data

Aug. 3, 1993 [DE] Germany .............. 43 260 69.1
Dec. 17, 1993 [DE] Germany .............. 43 424 00.7

[51] Int. Cl.⁶ ...................................... B60R 21/13
[52] U.S. Cl. ............................ 280/756; 297/410
[58] Field of Search .................. 280/756; 297/410; 296/107, 102, 35.2

[56] References Cited

U.S. PATENT DOCUMENTS 5,110,185  5/1992  Schwartz et al. ............... 297/410
5,205,585  4/1993  Reuber et al. ............... 297/410 X

FOREIGN PATENT DOCUMENTS 0459213  12/1991  European Pat. Off. .
0504482   9/1992  European Pat. Off. .
0623492  11/1994  European Pat. Off. ......... 280/756
3732562  11/1988  Germany ......... 280/756
3822461   1/1990  Germany ......... 280/756
3905470  12/1990  Germany ......... 260/756
4017778  12/1991  Germany .
4209094   9/1993  Germany .
4302152   7/1994  Germany ......... 280/756

*Primary Examiner*—Christopher P. Ellis
*Attorney, Agent, or Firm*—J. Gordon Lewis; Thomas N. Twomey

[57] ABSTRACT

A non-fixed roll bar system is disclosed which employs cylindrical, hollow-shaped standpipes for inner guidance of the legs of an essentially U-shaped roll bar. These standpipes are rigidly connected with a housing to be installed into a vehicle. For outer guidance of the bar legs, guide borings with radial play to the legs are provided in a guide block, which is also attached to the housing. This play is compensated by radially elastic guide bushings. This results in closed surface areas of the bar legs.

15 Claims, 2 Drawing Sheets

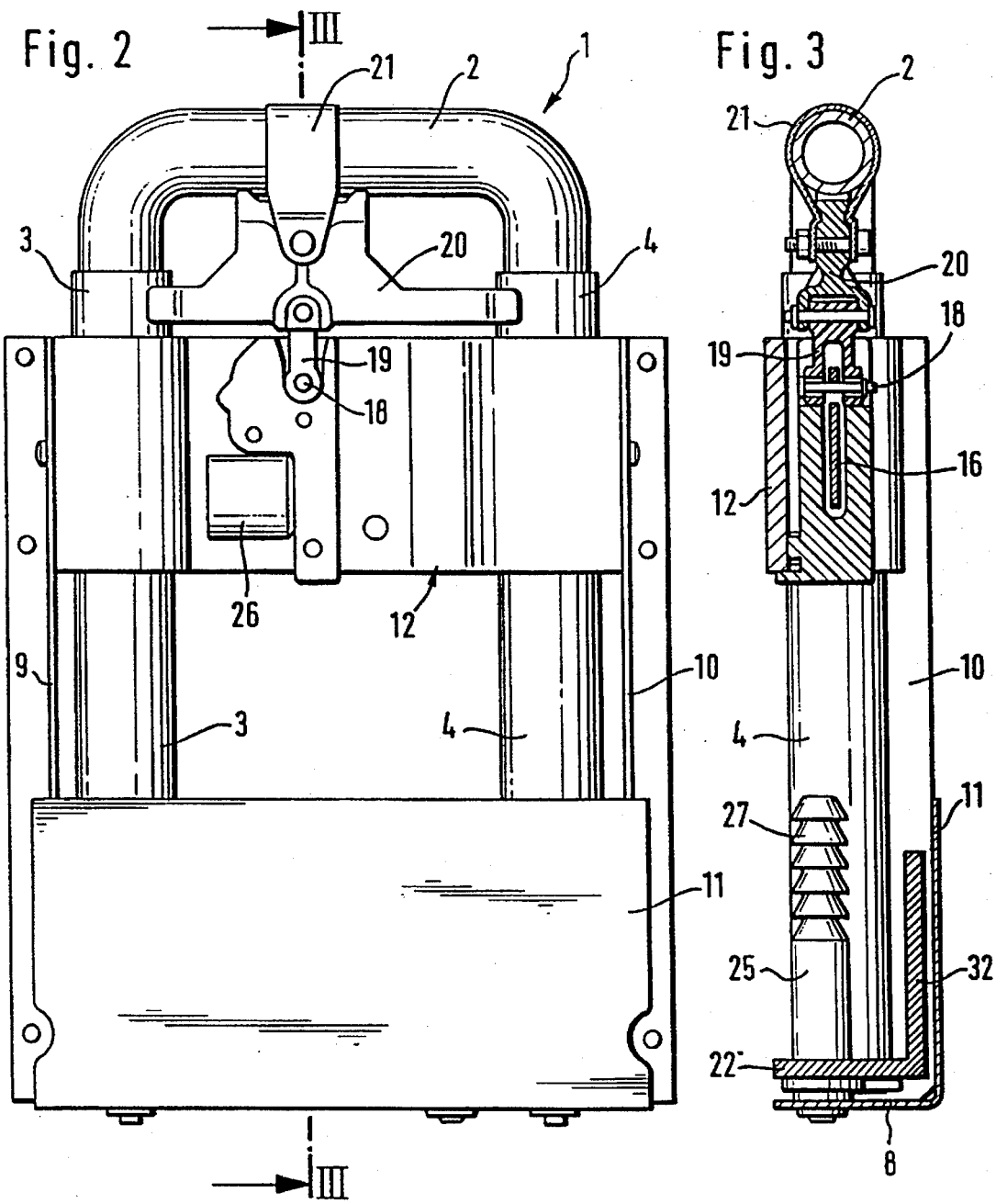
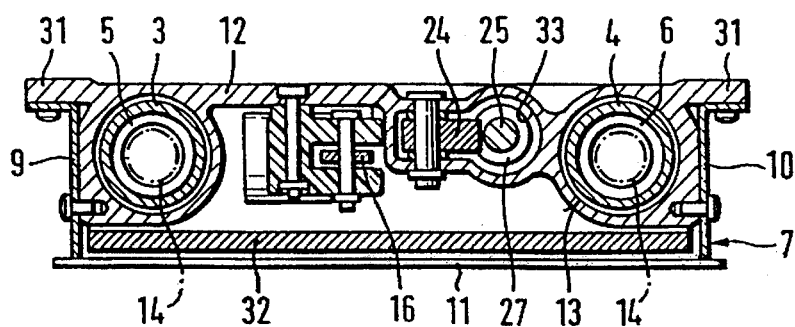

ROLL BAR EQUIPMENT WITH INNER GUIDE AND OUTER GUIDE

TECHNICAL FIELD

This invention relates to vehicle roll bars and particularly relates to non-stationary, vehicle roll bars.

BACKGROUND OF THE INVENTION

Roll bar equipment is often provided for the protection of the vehicle passengers in vehicles without a protective roof. In normal state, the roll bar should be reeled in order to minimize the wind resistance and the driving noise. On the other hand, in case of danger, the roll bar must be reeled out quickly in order to prevent the driver from being crushed by the rolling vehicle.

A number of solutions exist for this. For instance, it is known to reel out one bar each behind the front seats of the vehicle in order to provide protection for the vehicle passengers in case the vehicle rolls. This previously available bar is meant particularly for the protection in relatively heavy vehicles. Therefore, a reeled out bar is partially or completely reeled back into its original position by engine power after the danger condition is over. Such a construction is comparatively complicated and expensive.

Therefore, there have been considerations, particularly for the use of a roll bar in smaller vehicles, to design the former to be relatively light, so that it may be reeled out sufficiently quickly with comparatively low elastic force due to its low inertia. This low resilience of the spring, on the other hand, makes it possible to push the bar manually back into its original position once the danger is parted, thereby preventing an expensive conveyance by motor. It has been suggested to keep the side legs of a roll bar in standpipes which are attached to a housing and whose diameters are significantly smaller than those of the bar legs, and which align with the bar legs. In order to have an improved inner guide when the bar is reeled out, a cylinder shaped support is provided on the upper end of a stationary housing which is attached to the housing by a narrow support shoulder. Because the attachment of the support cylinder is located on the outside of the bar leg, but the support itself engages on the inner surface of the bar leg, the bar leg itself is equipped with slits so that it may glide over the bar support. Such slits are not only expensive to produce, but they also reduce the rigidity of the bar leg, particularly as it relates to lateral shear forces.

The present invention, however, is based on a roll bar equipment with the underlying task to further simplify the suggested system in order to make such roll bar equipment applicable for smaller vehicles as well.

The objects of the present invention are accomplished by using pipes with a closed surface area exclusively for the inner guide of the bar legs, whose end which faces away from the bar is attached on the housing. This makes it possible to do without the above described slits in the bar legs. At the same time, the comparatively long standpipes provide a good strengthening in the guide area of the bar legs. Practical applications have shown that it is possible to operate with such an inner guide which, according to its type, is supported by an outer guide, particularly on the bar-side end of the housing, in previously known fashion.

In addition to cylindrical cross sections for the bar legs and the standpipes oval or square cross sections may be selected for stability reasons.

In order to prevent that in the case of a crash the latch element which is movable in connection with the bar may yield in relation to the handle, and in order to strengthen the support effect of the bar in the case of a crash, a detent pawl engages the latch element. The profile of the latch opening is selected such that while the detent pawl may perform the required swivel motion, a swivel motion of the latch element will definitely be prevented by the abutment on the inner surface of the latch opening.

Because the turning position of the latch element is unimportant for its ability to be operated, such a latch element is very easily mounted.

The production of the latch element is achieved particularly cost-efficiently by using a simple steel cylinder eliminating the need for metal-cutting processing.

The rotation symmetrical shape of the latch arbor, however, also permits processing by lathing. In order to better fixate the location of the legs in relation to each other, the open ends of the bar legs preferably are enclosed by respective openings in the connecting plate and are thereby stopped against each other.

An additional bracing between the bar legs is achieved by arranging the connecting plate into first and second angled portions wherein said second angled portion is parallel to the bar. This prevents that the connecting plate which is preferably attached on the lower end of the bar legs may be bent by a moment of torsion on the bar legs.

The manual activation of the detent pawl serve to return the bar into its original position after termination of the reeled out position of the roll bar, and therefore of the danger situation for the vehicle. This makes it possible to manually cancel the locked condition of the roll bar equipment and to manually push the roll bar into its original position. It is obvious that with these measures significant savings may be achieved compared to the known bars which are moved by a motor.

A particularly simple construction to support the bar in its original position is provided wherein a swivel hook is mounted in a magnetic support on the guide block to hold the bar in its original position.

A support fork is provided for threading into a support installation by its swivel motion without particular tolerance compensation which allows it to compensate existing location divergences of the two parts to be connected which may have been caused by faulty mounting or manufacturing differences. To the extent that the support fork and the fork support are made from plastic materials, it is sufficient that the support pin itself is a steel pin, in order to drastically reduce wear in the above mentioned support equipment. Using the dip ensures that the material on the basis leg of the roll bar is not weakened by attaching the fork support and therefore will retain the resistance required for the crash case.

The support equipment may be arranged particularly compact in the guide block by applying the asymmetrical construction of the fork support. In addition, the asymmetrical construction of the fork support permits the asymmetrical arrangement of the support equipment in the guide block so that the latch installation and the support equipment in the guide block may be located on a level which permits a compact construction.

The present invention also permits the tolerance of the guide boring in the guide block to be very large by additionally improving the elasticity of the guidance in relation to the bar. Therefore, the elastic guide bushing is preferably constructed such that the forces pressing on the surface area of the bar legs in case of a crash are distributed as widely as possible and the stress concentration is reduced to a minimum so that no shearing off or bending of the legs occurs.

Installation and mounting of the roll bar equipment are simplified by using the housing metal which consists of an essentially U-shaped frame whose closed end is strengthened by a cover plate while the open ends of the U-shaped housing blocks are connected together via the guide block. On the frame itself mounting rails may be attached or made in one piece from the housing sheet.

The above described measures essentially result in a cassette which is open on one side and which is easily installed. In addition, the base leg of the housing sheet limits the path of the connecting plate, while, in order to obtain a larger support surface of the two parts to each other, openings are provided in the housing which correspond to respective projections on the connecting plate, and the projections then enter the respective openings uninhibited, thereby permitting the abutment of the two plates against each other.

BRIEF DESCRIPTION OF THE DRAWINGS

FIG. 2 the front view according to FIG. 1 in reeled in position.

FIG. 3 a cut side view of the roll bar equipment in reeled in position according to FIG. 2 (referring to cut line III—III).

FIG. 4 a bird's eye view of the roll bar equipment cut along the line IV—IV.

DETAILED DESCRIPTION OF THE PREFERRED EMBODIMENTS

Figure 1:
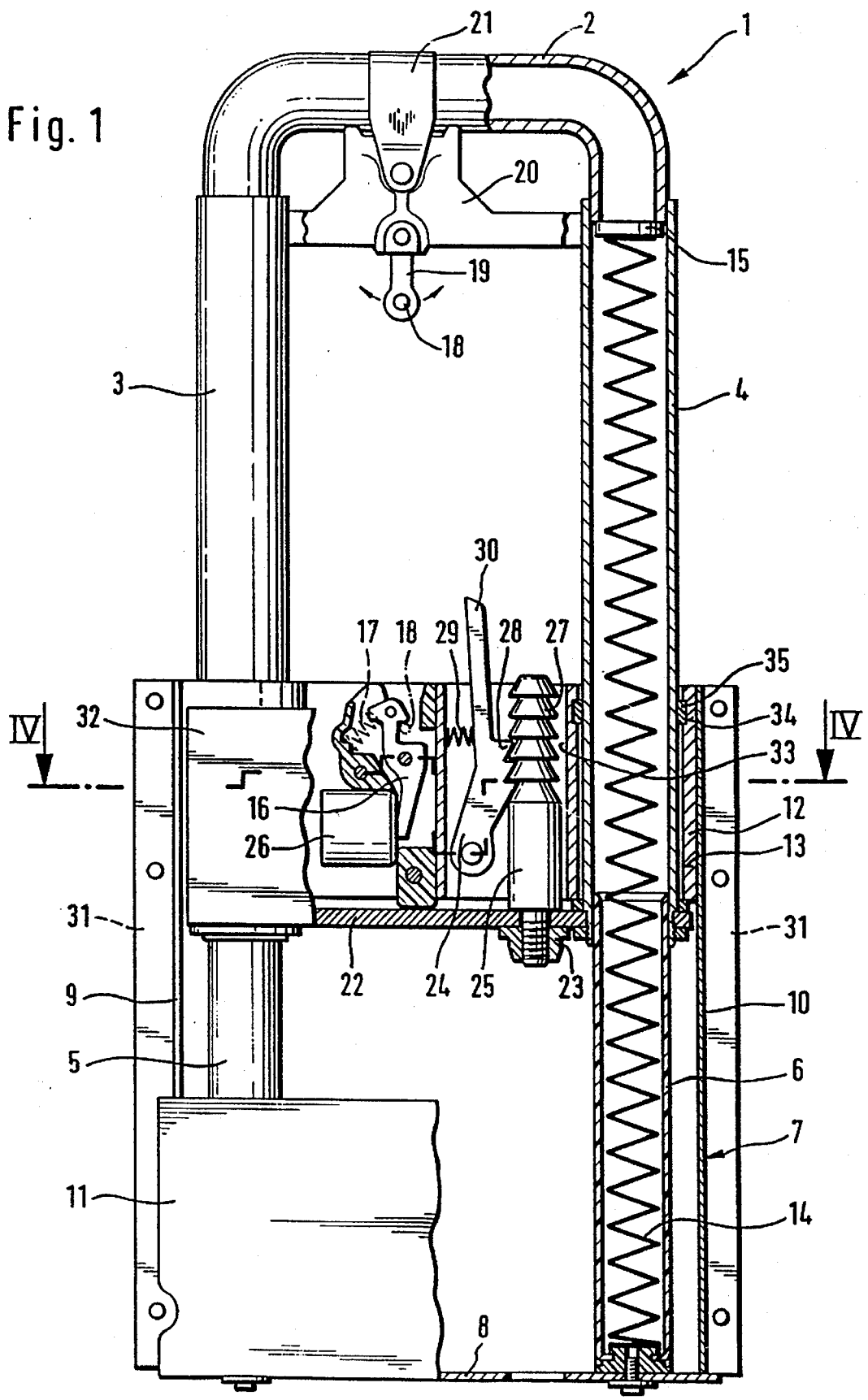
FIG. 1 a partial cut of a front view of a roll bar equipment according to the invention in reeled out position.

FIG. 1 shows the roll bar 1, which consists of the three pipes 2, 3, 4. The base leg of the roll bar 1 is essentially formed by a bent pipe 2, whose ends are rigidly connected with two leg pipes 3, 4 by welding or other suitable connecting procedures.

The leg pipes 3, 4 are guided in two standpipes 5, 6 reaching upward in FIG. 1. The standpipes 5, 6 are anchored on an essentially U-shaped housing 7, which is provided with a floor sheet 8 and two side sheets 9, 10. The two side sheets 9, 10 are strengthened by a cover plate 11 and form a cassette which is open on one end. The upper open ends of the side sheets 9, 10 are connected via a guide block 12. This cassette may also be made in one piece from a blank. The guide block 12 has two guide borings 13, which laterally support the surface are of the leg pipes 3, 4 and have a guidance with a very large tolerance for the leg pipes 3, 4 which move along the guide borings 13. On the upper end of the guide borings 13 which is facing the bent pipe 2, a radial depression or snap ting groove 34 is arranged which houses a ring-shaped, radial elastic guide bushing 35 which compensates the radial play of the bar legs 3, 4 in the guide borings 13. In addition, an inner guide is provided for the leg pipes which is ensured by the standpipes 5, 6 attached to the housing. At the same time, the standpipes also house a spring 14 which they prevent from bending and which ensures a prestress of the bar 1 in relation to the housing 7 in its original position, and which, in case of need, abruptly pushes out the bar 1 in relation to the housing while one end of the spring 14 is supported by the housing 7 and the other (in FIG. 1 the upper) end is supported by the rotating edge of the bent pipe 2 via a support disc 15, which is inserted into the leg pipe 4 or 5, together with the spring.

In order to maintain the roll bar 1 in original position in the original position shown in FIG. 2, a magnet support 40 is provided in the guide block 12, which is equipped with a notch lever 16 which may be swivelled, and which is prestressed in dockwise direction by a prestress spring 17, indicated in FIG. 1 by a dashed line. In original position the notch lever 16 grasps a support pin 18 as indicated in FIG. 1. In this way the notch lever 16, which below will be called swivel hook, keeps the roll bar 1 in its original position. The support pin 18 is fixed in a support fork 19, which may be swivelled, and which permits a swivel angle of 2°–3° and a fork support 20 as well as a clip 21 which connects the fork support 20 with the bent pipe 2 in relation to the roll bar 1. The support fork 19 is arranged asymmetrically in relation to the roll bar 1 in order to form the mounting space for a lock installation to be described below, which, in the case of crash, is designed to keep the roll bar 1 in its reeled out position and to prevent the bar from being crushed. Therefore, the open ends of the leg pipes 3, 4 are connected by suitable processes either detachably or non-detachably with a connecting plate 22 so that they form a unit together with the plate. On the plate a latch arbor 25 is attached, which again may be detachable or non-detachable.

In FIG. 1 the attachment occurs by a flanged nut 23. However, other processes, such as welding, riveting or compressing are also possible. Also in FIG. 1 the connecting plate 22 is screw connected with the ends of the leg pipes 3, 4 via capstan nuts. Again, other suitable means of attachment may be selected, however, keeping in mind the material selection described further below.

In FIG. 1, in reeled out position, facing the latch arbor 25 which serves as a latch element and which is threaded through the roll bar 1 a detent pawl 24, which may be swivelled, is located in a latch opening 33, in the guide block 12, thus in the housing. This causes the latch arbor 25 to perform a motion in relation to the detent pawl 24 when the roll bar moves. In the reeled in position shown in FIG. 2 the latch arbor 25 is located in the area of the floor sheet 8 and is therefore located far away from the detent pawl 24. If, however, the notch lever 16 is turned counter-clockwise by a solenoid 26 attached in the magnet support 40, then the roll bar 1 is moved into the final position shown in FIG. 1 by the effect of the spring 14. The teeth 27 of the latch arbor 25 move past the lock teeth 28 of the detent pawl 24 until the roll bar 1 with the connecting plate 22 reaches its final position on the guide block 12. In this position, the detent pawl 24 which is under prestress of a tension spring 29 abuts on the teeth 27 of the latch arbor 25 and thus prevents a downward directed movement of the roll bar in the case of a crash. The many offsets 7 in the latch arbor 25 allow a locking even if the roll bar 1 should not reach its final position.

In order to allow, for instance, manual retraction of the roll bar, the detent pawl 24 has a manually activated swivel lever 30, which is easily accessible to a service person in reeled out position of the roll bar while the swivel lever 30 may preferably not be operated in reeled in position.

As shown in FIG. 4 the guide block may also be equipped with lateral attachment sleeves 31 via which it may be attached, for instance, on the back of a vehicle seat.

In regard to the selection of materials it should be kept in mind that the roll bar equipment according to the invention should be very light. Particularly the parts which may be moved quickly should not weigh much in order to reduce their inertia. Therefore, the pipes 3, 4 forming the roll bar 1 as well as the bent pipe 2, but also the guide block 12, the connecting plate 22 and the side sheets 9 and 10 are made of aluminum. On the other hand, the latch arbor 25 and the detent pawl 24 are made of steel. The same applies to the cover plate 11 and the swivel hook 16.

The fork support 20 with support fork 19, the standpipes 5, 6 as well as the magnet support 40 are preferably made of plastic materials.

In order to increase the rigidity of the connecting plate 22 it has a side leg 32 which stands vertically on the plate and which is formed and attached in one piece, and which, together with the first leg, formed by the connecting plate 22, results in an angled section.

We claim:

1. Roll bar system including a housing, a guide block attached to the housing wherein said guide block includes a guide bore for outer guidance and wherein said guide block is attached to standpipes, comprising:

a U-shaped roll bar having two legs extending in a longitudinal direction, wherein said roll bar legs are each formed by a cylindrical hollow-shaped pipe which has a continuous closed surface area and wherein an inside wall of said hollow shaped pipe engages said standpipes, and wherein the guide block which is connected with the U-shaped roll bar is equipped with a latch opening which is adjusted to the profile of a latch element attached to the bar or to the housing and with a detent pawl acting together with the element, which is attached to the bar or to the housing and which permits a swivel motion of the detent pawl.

2. Roll bar system according to claim 1, wherein the cross sections of the bar leg and of the standpipe are oval.

3. Roll bar system according to claim 1, wherein the latch element is a lock pin comprised of a non-abrasive material and located opposite the U-shaped bar.

4. Roll bar system according to claim 3, wherein offsets are rolled into the latch element by way of a roller-burnish process.

5. Roll bar system according to claim 3, wherein offsets are lathed into the latch element.

6. Roll bar system according to claim 1, wherein the legs of the U-shaped roll bar are open at one of their respective ends and wherein the open ends are connected via a connecting plate while the latch element is also attached to the connecting plate.

7. Roll bar system according to claim 6, wherein the connecting plate is comprised of first and second members arranged at a 90 degree angle to one another.

8. Roll bar system according to claim 1, wherein the detent pawl is equipped with a swivel lever which may be manually activated, when the U-shaped roll bar is an extended position.

9. Roll bar system according to claim 1, further including a notch lever which is prestressed via a tension spring and is located in a magnet support while the notch lever is in a retracted position wherein said notch lever is attached to a support pin.

10. Roll bar system according to claim 9, wherein the support pin connects branched ends of a support fork, the support fork is swivelled at a small angle and is located in a fork support, which in turn is attached on the base section of the U-shaped roll bar by way of a clamp.

11. Roll bar system according to claim 10, wherein the fork support is supported laterally by both legs of the bar and the clamp and is arranged asymmetrically with respect to the roll bar legs.

12. Roll bar system according to claim 1, further including a guide bushing attached to said guide bore.

13. Roll bar system according to claim 1, further including U-shaped housing sheet metal connected to the guide block at its end which is proximate the U-shaped roll bar.

14. Roll bar system according to claim 13, wherein a cassette is formed by said U-shaped housing sheet metal and is closed by a floor sheet.

15. Roll bar system according to claim 1, wherein the cross section of the bar legs and of the standpipes are circular.

* * * * *